US005119276A

United States Patent [19]

Suzuki

[11] Patent Number: 5,119,276

[45] Date of Patent: Jun. 2, 1992

[54] VEHICULAR LAMP UNIT

[75] Inventor: Yoshinobu Suzuki, Shizuoka, Japan

[73] Assignee: Koito Manufacturing Co., Ltd., Tokyo, Japan

[21] Appl. No.: 581,359

[22] Filed: Sep. 12, 1990

[30] Foreign Application Priority Data

Sep. 13, 1989 [JP] Japan ............................ 1-235596

[51] Int. Cl.[5] ........................................ B60Q 1/00

[52] U.S. Cl. .................................. 362/61; 362/80; 362/299; 362/305; 362/327; 362/343; 362/346; 362/374; 362/375; 362/455; 362/456

[58] Field of Search ................. 362/61, 80, 455, 456, 362/299, 304, 305, 268, 359, 327, 343, 346, 374, 375

[56] References Cited

U.S. PATENT DOCUMENTS

| | | | |
|---|---|---|---|
| 2,169,531 | 8/1939 | Jennings | 362/61 |
| 4,414,614 | 11/1983 | McMahan et al. | 362/80 |
| 4,685,036 | 8/1987 | Loewe et al. | 362/61 |
| 4,710,855 | 12/1987 | Urbschat | 362/66 |
| 4,797,790 | 1/1989 | Brodling et al. | 362/61 |
| 4,839,785 | 6/1989 | Ohishi | 362/61 |
| 4,841,419 | 6/1989 | Ohishi | 362/61 |
| 4,949,226 | 8/1990 | Makita et al. | 362/61 |

*Primary Examiner*—Ira S. Lazarus
*Assistant Examiner*—Sue Hagarman
*Attorney, Agent, or Firm*—Sughrue, Mion, Zinn, Macpeak & Seas

[57] ABSTRACT

A lamp unit having an elliptic reflector, a light source positioned at a first focus point of the elliptic reflector, a bracket fixed to a front end of the reflector, a projection lens mounted on a front end of the bracket and a holder member for holding the projection lens onto the bracket. The holder member is a plate like member provided along the circumference of the bracket. One end of the holder member is bent inward to form a bent portion which supports a rear end of the projection lens, while the other end of which is partially press-fitted in a plurality of holes formed on a side surface of the bracket.

16 Claims, 2 Drawing Sheets

VEHICULAR LAMP UNIT

BACKGROUND OF THE INVENTION

The present invention relates to a vehicular lamp unit, and more particularly to a projection lamp structure for a vehicular lamp unit of a type which produces a substantially parallel light beam from the light generated by a light source using an elliptic reflector and a projection lens.

A vehicular lamp such as a headlamp of an automobile produces a substantially parallel light beam from the light generated by a light source. Such headlamps include a type in which the light produced by a light source is formed into a substantially parallel beam by a parabolic reflector, and another type in which the light is made substantially parallel by a combination of an elliptic reflector and a projection lens. The latter type is a so-called projection lamp. Projection lamps are advantageous in that they can be made small in size but still produce a required light distribution pattern.

An example of projection lamp is disclosed in U.S. Pat. Nos. 4,685,036, 4,677,532 and 4,797,790, and is shown in FIG. 5. The conventional projection lamp is provided with an elliptic reflector 1 and a metal bracket 2 fixed to a front end of the reflector 1. A projection lens 4 is mounted on the bracket 2 through a holder member 3.

As is apparent from FIG. 5, the holder member 3, which is substantially box shaped, is fixed to the bracket 2 to support the projection lens 4. As a result, the conventional lamp unit is disadvantageous in that it requires a large space for accommodating the assembled box-shaped holder member 3. Further, the diameter of the bracket 2 must be relatively great. Thus, the conventional projection lamp is larger than desired.

SUMMARY OF THE INVENTION

In view of the foregoing problems accompanying the conventional projection lamp, it is an object of the present invention to provide an improved projection lamp unit employing a bracket which is small and is constructed in such a manner that the overall vehicular lamp can be made small in size.

The above and other objects of the invention are achieved by the provision of a lamp unit which, according to the present invention, has an elliptic reflector, a light source positioned at a first focus point of the elliptic reflector, a bracket fixed to a front end of the reflector, a projection lens mounted on a front end of the bracket and a holder member which holds the projection lens onto the bracket. The holder member is a plate-like member provided along the circumference of the bracket. One end of the holder member is bent inward to form a bent portion which supports the rear end of the projection lens, while the other end is partially pressed into a plurality of holes formed on a side surface of the bracket.

Since the holder member is plate-like with a flange at a front end thereof, which flange supports the projection lens, and the other end of the holder member is pressed into the holes of the bracket, it is not necessary to accommodate the holder member in the bracket in the manner of the conventional lamp unit. Further, since the plate-like holder member is mounted on the circumference of the bracket, the diameter of the bracket can be made small and, accordingly, the vehicular lamp as a whole can be made small compared to the conventional lamp.

DESCRIPTION OF THE PREFERRED EMBODIMENTS

Preferred embodiments of the present invention will now be described with reference to accompanying FIGS. 1A, 1B and 2.

Figure 1A:
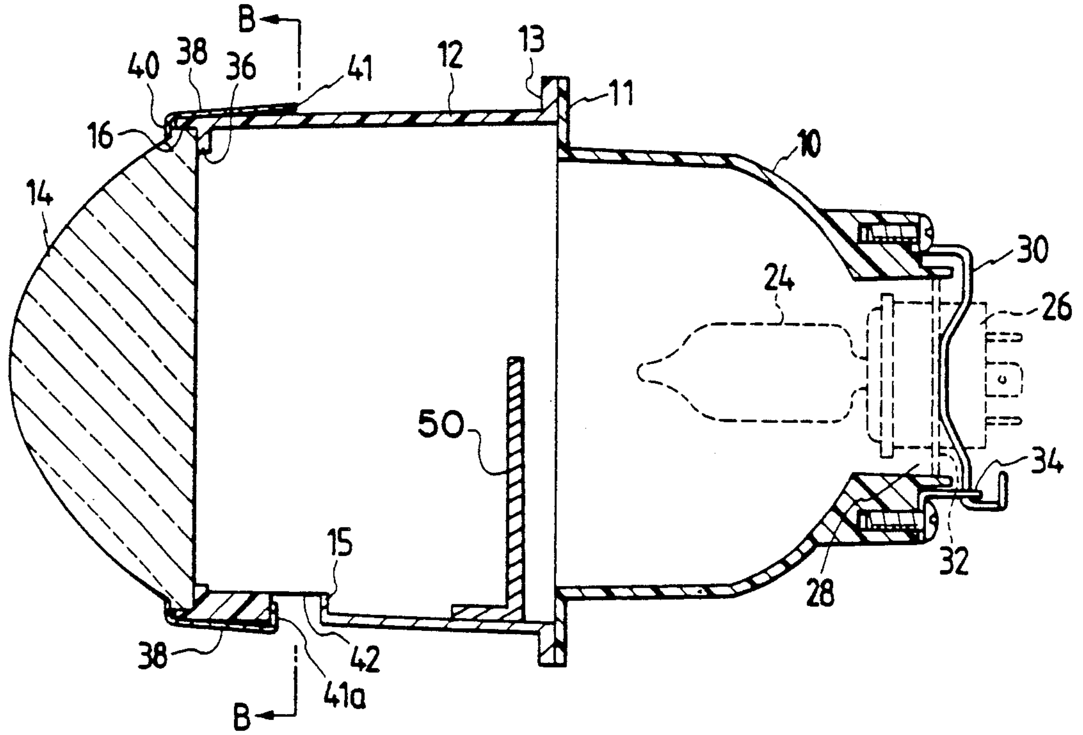
FIG. 1A is a sectional view of a vehicular lamp unit constructed according to a preferred embodiment of the present invention.
Figure 1B:
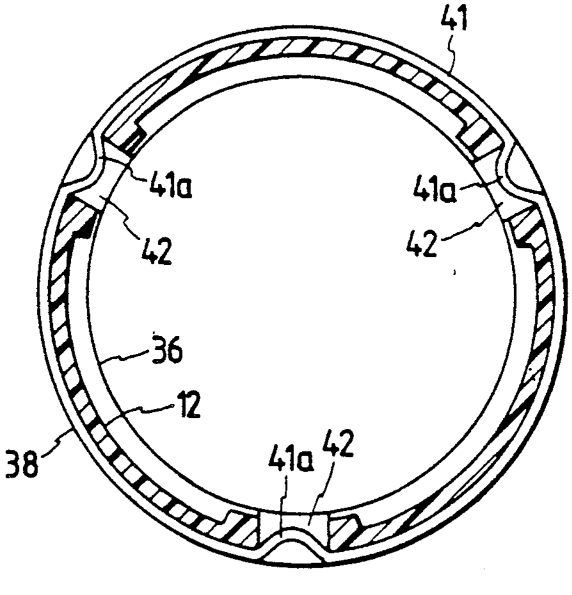
FIG. 1B is a view taken along a line B—B in FIG. 1A.
Figure 2:
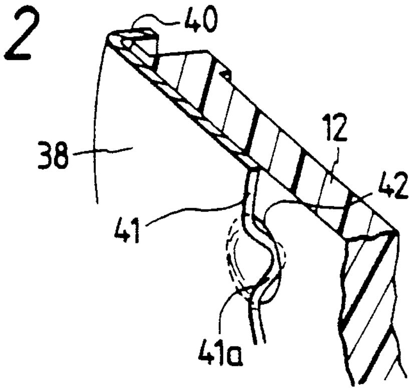
FIG. 2 is a perspective view showing an essential part of the vehicular lamp unit shown in FIGS. 1A and 1B.

FIG. 1A shows a lamp unit composed of an elliptic reflector 10 and a projection lens 14 accommodated in a lamp body (not shown). An outer cover is fixed to the lamp body over the projection lens. A bulb 24 acting as a light source is provided in the elliptic reflector 10, and a filament of the bulb 24 is positioned at a first focus point of the elliptic reflector 10. The bulb 24 is fitted in a connector 26 which is urged against and mounted in a rear end opening 28 of the elliptic reflector 10 by the elastic force of a set spring 30. That is, the connector 26 is inserted into the opening 28 from the rear side thereof, and a flange portion 32 of the connector 26 is engaged with a peripheral portion of the opening 28. One end of the set spring 30 is pivotally mounted near an opening 28, while the other end of the set spring 30 is engaged by a hook 34 provided at the opposite side on the peripheral portion of the opening 28. The flange portion 32 of the connector 26 is urged forward by a center part of the set spring 30, so that the connector 26 is urged against and mounted in the rear end opening 28 of the elliptic reflector 10.

The elliptic reflector 10 is provided with a flange 11 at a front opening thereof. A cylindrical bracket 12 has an opening at both ends and a protruding part 13 at one end thereof. The flange 11 of the elliptic reflector 10 and the protruding part 13 of the bracket 12 are firmly connected to each other by a bolt, spot welding, press-fitting or the like, so that the elliptic reflector 10 and the bracket 12 are held together as a unit. The bracket 12 is provided at one end thereof with an annular projection part 36 projecting inward.

The elliptic reflector 10 and the bracket 12 may be formed of die-cast aluminum or resin, for example. As shown in FIG. 1B, there are provided three holes 42 in the bracket 12, which holes are spaced apart from each other by equal distances. The parts of the bracket 12 on which the holes 42 are formed are made thicker than the other parts of the bracket. The thick parts of the bracket 12 function as an inwardly extending wall 15, which wall prevents the light produced by the bulb 24 from leaking through the holes 42.

The outer edge of the projection lens 14 forms a flange 16 having a rear surface and an outer surface which contact the annular projection part 36 and an edge surface of the bracket 12, respectively. A substantially cylindrical holder member 38 formed of a metal plate has free ends. One end of the holder member 38 is bent to form a bent portion 40, while the other end forms an opening portion 41 which is substantially circular in cross section. The inner surface of the bent portion 40 abuts against the front surface of the flange 16 of the projection lens 14, and the opening portion 41 is partially pressed into the hole 42. Thus, the projection lens 14 is secured to the bracket 12. Reference numeral 41*a* indicates the pressed-in portion.

The circumferential length of the holder member 38 is determined so that the opening portion 41 of the holder member 38 partially covers the holes 42. The inner diameter of the holder member 38 is substantially the same as the outer diameter of the bracket 12. Therefore, the holder member 38 is mounted on the bracket 12 to cover an end portion thereof. The inner diameter of the holder member 38 varies, increasing towards the opening portion 41, so that the inner diameter of the opening portion 41 is larger than the outer diameter of the bracket 12, thereby eliminating a spring-back reaction which otherwise could occur when the opening portion 41 of the holder member 38 is pressed into the holes 42 of the bracket 12.

A silicon adhesive or a silicon packing is provided between the annular projection part 36 and the flange 16 of the projection lens 14 to absorb any shock which might occur when the holder member 38 is pressed into the holes 42 of the bracket 12. Damage to the projection lens 14 is thus prevented. The holes 42 also perform the function of discharging heat from the lamp unit generated by the bulb 24. Since there is provided a plurality of (three in this embodiment) holes 42, a air flow is obtained.

During the assembly of the vehicular lamp unit, first the projection lens 14 is fitted in one opening of the bracket 12 so that the rear surface of the flange 16 of the projection lens 14 is supported by the annular projection part 36 of the bracket 12, and then the holder member 38 is mounted on the projection lens 14 from the front side thereof so that the bent portion 40 of the holder member 38 presses against the flange 16 of the projection lens 14. In this condition, the parts of the opening portion 41 of the holder member 38 facing the holes 42 are pressed into the respective holes 42 of the bracket 12. The pressing operation can easily be achieved by, for example, a metal rod tool having a conical head.

According to the present invention, it is not necessary to assemble the box-like holder member in the manner required by the conventional lamp and, further, it is not necessary to provide a space inside the bracket 12 for accommodating the assembled holder member. Therefore, the bracket 12 has a minimum capacity sufficient for obtaining a required light distribution. The lamp unit can be made smaller in size than the conventional lamp unit, whereby the lamp body (not shown) for accommodating the bracket 12 and the projection lens 14 can also be made small.

Generally, the cylindrical bracket 12 acts to prevent light generated by the light source from leaking to the outside, but restrains the flow of heat. However, the holes 42 of the construction of the present invention also function as heat discharging holes. No other holes for discharging the heat are necessary.

Figure 3:
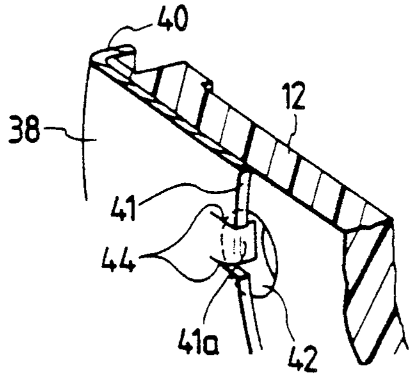
FIG. 3 is a perspective view showing a modification of the part of the vehicular lamp unit shown in FIG. 2.
Figure 4:
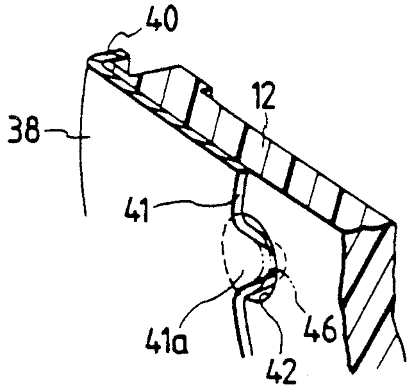
FIG. 4 is a perspective view showing another modification of the part of the vehicular lamp unit shown in FIG. 2.
Figure 5:
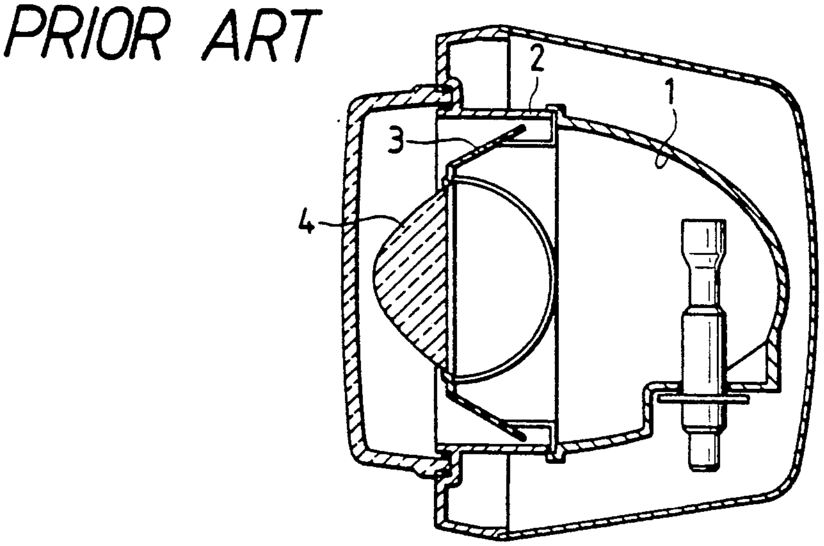
FIG. 5 PRIOR ART
FIG. 5 is a sectional view of a conventional lamp unit.

Although the opening portion 41 of the holder member 38 is not previously processed according to the embodiment described above, as shown in FIG. 3, the part of the opening portion 41 of the holder member 38 facing the hole 42 may previously be provided with a cut-out portion 44 to allow for an easy and reliable pressing operation. Further, as illustrated in FIG. 4, the opening portion 41 of the holder member 38 may be provided with a protrusion 46 (double dotted line) extending therefrom for easily and firmly press-fitting into the hole 42.

Although the elliptic reflector 10 and the bracket 12 are separately provided in the embodiment described above, the invention is not limited thereto or thereby. That is, the elliptic reflector 10 and the bracket 12 may be unitarily formed. Further, the number of holes 42 may be more or less than three although the above described embodiment shows three holes 42. Furthermore, as shown in FIG. 1A, a shading member 50 may be disposed, if necessary, in the lamp unit at the focus point of the projection lens 14. Normally, the lamp unit according to the present invention is housed in a lamp body to which an outer cover is provided over the projection lens 14.

As described above, according to the vehicular lamp unit of the present invention, the holder member which holds the projection lens onto the bracket is formed of a plate-like member which is mounted along the circumference of the bracket. Accordingly, a space for accommodating therein the assembled holder member is no longer necessary as is different from the conventional lamp unit, which results advantageously in that the diameter of the bracket can be made short and also the bracket itself can be made small. Thus, the vehicular lamp as a whole can be made small.

What is claimed is:

1. A vehicular lamp unit, comprising:

an elliptic reflector;

a light source provided in said elliptic reflector at a first focus point of said reflector;

a bracket connected at a first end opening thereof to one end of said elliptic reflector, said bracket having a plurality of holes;

a projection lens fitted in a second end opening of said bracket;

means for holding said projection lens onto said bracket, said holding means comprising a plate-like member substantially circular shaped in cross section mounted along a circumference of said bracket, and engaging means extending from a first end of said plate-like member for engaging with said holes of said bracket to fix said holding means to said bracket.

2. The vehicular lamp unit according to claim 1, wherein said engaging means of said holding means has a first end partially press-fitted into said holes of said bracket.

3. The vehicular lamp unit according to claim 1, wherein said engaging means has a second end bent inward to support a rear end of said projection lens.

4. The vehicular lamp unit according to claim 3, wherein said projection lens has a flange provided at a rear end thereof, said flange being supported by said bent second end of said engaging means.

5. The vehicular lamp unit according to claim 4, wherein said bracket has a first flange abutting against said flange of said projection lens.

6. The vehicular lamp unit according to claim 1, wherein one of a silicon adhesive and a silicon packing is provided between a flange of a bracket and said flange of said projection lens.

7. The vehicular lamp unit according to claim 1, wherein said elliptic reflector and said bracket are unitarily formed.

8. The vehicular lamp unit according to claim 1, wherein said elliptic reflector has a flange and said bracket has a second flange which is secured to said flange of said elliptic reflector by one of a bolt, spot welding and a press-fitting operation.

9. The vehicular lamp unit according to claim 1, further comprising a shading member provided at a focus point of said projection lens.

10. The vehicular lamp unit according to claim 1, further comprising a lamp body accommodating said elliptic reflector, said bracket and said projection lens, and an outer cover fixed to said lamp body over said projection lens.

11. The vehicular lamp unit according to claim 1, wherein said elliptic reflector and the bracket are formed of die-cast aluminum.

12. The vehicular lamp unit according to claim 1, wherein said elliptic reflector and the bracket are formed of resin.

13. The vehicular lamp unit according to claim 1, wherein the circumferential length of said engaging means is determined so that said engaging means partially covers said holes of said bracket.

14. The vehicular lamp unit according to claim 1 wherein the number of said holes of said bracket is three.

15. The vehicular lamp unit according to claim 1, wherein said engaging means has a cut-out part facing said holes of said bracket.

16. The vehicular lamp unit according to claim 1, wherein said engaging means has a protruding part facing said holes of said bracket.

* * * * *